(12) United States Patent
Kang et al.

(10) Patent No.: US 7,593,937 B2
(45) Date of Patent: Sep. 22, 2009

(54) APPARATUS, MEDIUM, AND METHOD CLUSTERING AUDIO FILES

(75) Inventors: In-ho Kang, Daegu-si (KR); Jeong-su Kim, Yongin-si (KR); Jung-eun Kim, Seongnam-si (KR); Jae-won Lee, Seoul (KR); Jeong-mi Cho, Yeonton-gu (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 266 days.

(21) Appl. No.: 11/489,463

(22) Filed: Jul. 20, 2006

(65) Prior Publication Data

US 2007/0043768 A1 Feb. 22, 2007

(30) Foreign Application Priority Data

Aug. 19, 2005 (KR) .................... 10-2005-0076335

(51) Int. Cl.
G06F 17/30 (2006.01)
G06F 7/00 (2006.01)
(52) U.S. Cl. .................................. 707/6; 707/3; 707/7
(58) Field of Classification Search .................. 707/3, 707/6
See application file for complete search history.

(56) References Cited

U.S. PATENT DOCUMENTS

| | | | |
|---|---|---|---|
| 6,339,767 B1 * | 1/2002 | Rivette et al. ............... | 707/2 |
| 6,801,906 B1 * | 10/2004 | Bates et al. .................. | 707/3 |
| 2003/0158839 A1 * | 8/2003 | Faybishenko et al. ......... | 707/3 |
| 2003/0204492 A1 * | 10/2003 | Wolf et al. ................... | 707/3 |
| 2003/0217052 A1 * | 11/2003 | Rubenczyk et al. ........... | 707/3 |
| 2005/0055341 A1 * | 3/2005 | Haahr et al. ................. | 707/3 |

OTHER PUBLICATIONS

Jain, A.K., Data Clutering: a review, 1999, ACM, ISBN: 0360-0300.*
Hall, Branden; International Conference on Computer Graphics and Interactive Techniques; 2002; ACM; 236.*
Reyes-Gomes, Manuel j; Selection, Parameter Estimation, and Discriminative Training of Hidden Markov Models for General Audio Modeling; Jul. 2003; Multimedia and Expo, 2003, ICME '03 Proceedings; vol. 1; 1-4.*

* cited by examiner

Primary Examiner—Kuen S Lu
Assistant Examiner—Jermaine Mincey
(74) Attorney, Agent, or Firm—Staas & Halsey LLP

(57) ABSTRACT

An apparatus, medium, and method providing audio files with clustering, with audio files having information similar to queries input from a user being extracted and undergo clustering. A method for providing audio files with clustering includes calculating scores between queries input from a user and a specified audio file, detecting audio files having specified scores with the queries input from the user on the basis of the result of calculation and performing a dynamic clustering of the audio files, detecting the audio files having the specified scores with the queries input from the user and performing a static clustering of the audio files, and displaying the dynamic cluster or the static cluster on a screen.

31 Claims, 8 Drawing Sheets

FIG. 2

| CORE INDEX WORD | ID | tf | df |
|---|---|---|---|
| SAD LOVE SONG | 1 | 1 | 10 |
| OST | 2 | 1 | 50 |
| SAD LOVE SONG OST | 4 | 1 | 2 |
| SEUNGHEON SONG | 12 | 1 | 2 |
| EVEN AFTER THE LAPSE OF TEN YEARS | 40 | 1 | 1 |
| PREFERENCE OF SILENT STATUS | 80 | 1 | 36 |
| SILENT PLACE | 180 | 1 | 50 |
| ... | ... | ... | ... |

FIG. 3

FILE NAME: (SAD LOVE SONG OST) SEUNGHEON SONG – EVEN AFTER THE LAPSE OF TEN YEARS.mp3

TAGGING OF A PART OF SPEECH — S10
(SYM+SAD/PAA+LOVE SONG/NC+OST/F+)SYM SEUNGHEON SONG/NQ–SYM TEN/NN+YEAR/NB+OJ/JC LAPSE/PVG+EVEN/ECS

RECOGNITION OF INDIVIDUAL NAMES — S20
(SYM+SAD/PAA+[LOVE SONG/NC]+[OST/F]+)SYM[SEUNGHEON SONG/NQ]–SYM[TEN/NN+YEAR/NB]+OJ/JC LAPSE/PVG+EVEN/ECS

EXTRACTION OF CORE INDEX WORDS — S30
SAD, LOVE SONG, SAD LOVE SONG, OST, SAD LOVE SONG OST, SEUNGHEON SONG, TEN YEARS, EVEN AFTER THE LAPSE OF TEN YEARS

EMOTION INFORMATION — S40
SAD_sad, LOVE SONG_love, SAD LOVE SONG_sad

APPARATUS, MEDIUM, AND METHOD CLUSTERING AUDIO FILES

CROSS-REFERENCE TO RELATED APPLICATIONS

This application is based on and claims the priority benefit from Korean Patent Application No. 10-2005-0076335, filed on Aug. 19, 2005, the disclosure of which is incorporated herein in its entirety by reference.

BACKGROUND OF THE INVENTION

1. Field of the Invention

Embodiments of the present invention relate at least to an apparatus, medium, and method clustering audio files, and more particularly, to an apparatus, medium, and method providing audio files using clustering, where audio files having information similar to a query input from a user are extracted and undergo clustering to provide the clustered audio files.

2. Description of the Related Art

Recently, portable audio file players that can play digital audio files have become more common. Accordingly, relatively small-sized hand-held devices that can reproduce and store such audio files, e.g., on a semiconductor memory device, have similarly received much attention.

With the increase in demand for higher data storage capacities in such portable audio file players, there has also been recent research and development into the next generation players that include small-sized high-capacity hard drives.

Such digital audio files may be loaded into a data storage device of an audio file player after having been downloaded from an audio CD, Internet, or another digital audio device to a PC, for example. The digital audio file data may then be compressed in a selected encoding format and loaded into the data storage device.

Similarly, the audio files may be decompressed and decoded by the audio file player, in accordance with a respective encoding format, during reproduction. Various encoding formats for compressing and decompressing audio files have be used, e.g., MP3 and MP3 Pro, noting that additional encoding formats are equally available.

As only an example, in the case of audio files encoded using MP3, the audio files are provided with a specified frame set, an ID3 tag, at a front or rear of the audio file. Such an ID3 tag may include description text and other data relating to the underlying audio file. For example, the tag may include information such as title, artist, album, year, genre, and comments. The ID3 tag information may also be used to retrieve, sort, and select a specified audio file, and since the ID3 tag information is often stored as text characters, the ID3 tag may be displayed on a display screen of the audio file player.

However, with the development of such technologies, it is a general tendency that devices like the audio file player are made ever so smaller in size, especially as the memory and computing elements therein are minimized. With this tendency, the size of the audio file player may become small and provide only a small-sized display window. This small-sized display is actually inconvenient when a user attempts to select music, e.g., by manipulating a small-sized button, while attempting to view the display window.

In addition, in these smaller devices there is also a problem in that it takes a long time to retrieve a desired audio file, especially with the increase of the number of audio files stored in audio file players.

To efficiently retrieve a user desired audio file, there have been attempts to provide audio files through speech recognition, based on speech recognition of a spoken title, singer's name, or first character, or attempts to retrieve audio files based on a recognized melody or sound, such as humming, or attempts to provide music files having features (singer/album/melody) similar to a currently listened to music by preparing and applying a fingerprint to the audio files that may make it easier to characterize and search for audio files.

However, there are problems with these above methods in that the user retrieval of audio files depends on the underlying sort and intrinsic features of the audio files. It may also be beneficial to remember a complete type of information on files to be retrieved by the user, and provide partial retrieval and remindful retrieval.

In addition, the above methods have further problems in that the retrieval time increases in proportion to the number of audio files to be retrieved. Further, as audio files may not be displayed on a screen, it may take a predetermined time for allowing the user to identify the result of a preferred retrieval of audio files retrieved.

SUMMARY OF THE INVENTION

Accordingly, embodiments of the present invention have been made to solve above-mentioned problems, with an aspect of the present invention being to permit the extraction of audio files having information similar to a query input from a user and to cluster the audio files to provide the clustered audio files to the user for proper selection of a preferred audio file cluster.

Another aspect of an embodiment of the present invention is to allow a user to select desired audio files without having to sift through screens, by clustering the audio files and displaying the generated clusters on one screen.

Additional aspects and/or advantages of the invention will be set forth in part in the description which follows and, in part, will be apparent from the description, or may be learned by practice of the invention.

To achieve the above and/or other aspects and advantage, embodiments of the present invention include an apparatus, including a calculation unit to calculate respective scores between a plurality of audio files and a query, a dynamic clustering unit to identify first audio files, of the plurality of audio files, based on the calculated respective scores between the plurality of audio files and the query, and to cluster the identified first audio files by calculating scores between the identified first audio files, a static clustering unit to identify second audio files, of the plurality of audio files, based on the calculated respective scores between the plurality of audio files and the query, and to cluster the identified second audio files based on respective weights of core index words of the identified second audio files, wherein the weights of the core index words are respective weights of extracted core index words for the plurality of audio files, and an output to output a result of dynamic clustering of the identified first audio files and/or a result of static clustering of the identified second audio files.

The apparatus may further include a display unit for displaying the dynamic cluster or the static cluster on a screen.

In addition, the apparatus may also include an information extraction unit to extract metadata from audio files and to obtain the extracted core index words based on the extracted metadata.

The calculation unit may further calculate the weights of the extracted core index words for the plurality of audio files, respectively.

In addition, the calculation unit may calculate the respective weights of the core index words based on:

$$weight(x_i) = \frac{tf}{0.5 + 1.5s\frac{doclength}{avg.doclength} + tf} slog\left(\frac{N - df + 0.5}{df + 0.5}\right)$$

Here, doclength represents a number of core index words of a current audio file, avg.doclength represents an average doc length of audio files, tf represents a frequency of a current core index word shown in a corresponding audio file, df represents a number of audio files that include the current core index word, and N represents a total number of audio files.

The calculation unit may calculate the scores between the plurality of audio files and the query based on:

$$score(d) = \overset{m}{\underset{i=0}{Q}} weight_d(q_i) sweight(q_i)$$

Here, weightd(qi) represents a weight of a core index word qi in an audio file d, and weight(qi) represents a weight of a core index word qi.

The dynamic clustering unit may calculate the scores between the identified first audio files based on:

$$sim(x, y) = \frac{x \in y}{\|x\|\|y\|}.$$

In addition, the apparatus may include a cluster overlap unit to overlap the dynamically clustered first identified audio files with the statically clustered second identified audio files to generate a cluster having audio files similar to the query.

Still further, the apparatus may include a speech recognition unit for analyzing the query, input from the user, to attempt to recognize the audible input query. The audible input query may also include a plurality of words.

The apparatus may include non-volatile memory to store the plurality of audio files, and a reproducing unit to output reproduced audio based upon a user selection, wherein the user is provided with an audio file between the plurality of audio files based upon clustering from the dynamic and/or static clustering units.

To achieve the above and/or other aspects and advantage, embodiments of the present invention include a method for providing audio file using clustering, including calculating respective scores between a plurality of audio files and a query, identifying first audio files, of the plurality of audio files, based on the calculated respective scores between the plurality of audio files and the query, and performing a dynamic clustering of the identified first audio files based on scores between the identified first audio files, identifying second audio files, of the plurality of audio files, based on the calculated respective scores between the plurality of audio files and the query, and performing a static clustering of the identified second audio files based upon weights of detected core index words for the plurality of audio files, and outputting a result of the dynamic clustering of the identified first audio files and/or a result of the static clustering of the identified second audio files.

The method may further include displaying the result of the dynamic clustering of the identified first audio files and/or the result of the static clustering of the identified second audio files on a screen.

In addition, the method may include detecting respective core index words for the plurality of audio files, and calculating weights of the detected respective core index words.

The weights of the detected core index words may be calculated based on:

$$weight(x_i) = \frac{tf}{0.5 + 1.5s\frac{doclength}{avg.doclength} + tf} slog\left(\frac{N - df + 0.5}{df + 0.5}\right)$$

Here, doclength represents a number of core index words of a current audio file, avg.doclength represents an average document length of audio files, tf represents a frequency of a current core index word shown in a corresponding audio file, df represents a number of audio files that include the current core index word, and N represents a total number of audio files.

The calculating of the respective scores between the plurality of audio files and the query may be based on:

$$score(d) = \overset{m}{\underset{i=0}{Q}} weight_d(q_i) sweight(q_i)$$

Here, weightd(qi) represents a weight of a core index word qi in an audio file d, and weight(qi) represents a weight of a core index word qi.

Further, the dynamic clustering may be performed based on the scores between the identified first audio files through an equation:

$$sim(x, y) = \frac{x \in y}{\|x\|\|y\|}.$$

The method may include analyzing the query, audibly input from the user, to attempt to recognize the audible input query. The audible input query may also include a plurality of words.

Still further, the method may include accessing non-volatile memory for the plurality of audio files, and outputting reproduced audio based upon a user selection, wherein the user is provided with an audio file from the plurality of audio files based upon the result of the dynamic clustering of the identified first audio files and/or the result of the static clustering of the identified second audio files.

To achieve the above and/or other aspects and advantage, embodiments of the present invention include a medium including computer readable code to implement embodiments of the present invention.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 2 illustrates an information table of a specified audio file, according to an embodiment of the present invention;

FIG. 3 illustrates an extracting of core index words of an audio file, e.g., through an information extraction unit, according to an embodiment of the present invention;

DETAILED DESCRIPTION OF THE PREFERRED EMBODIMENTS

Figure 1:
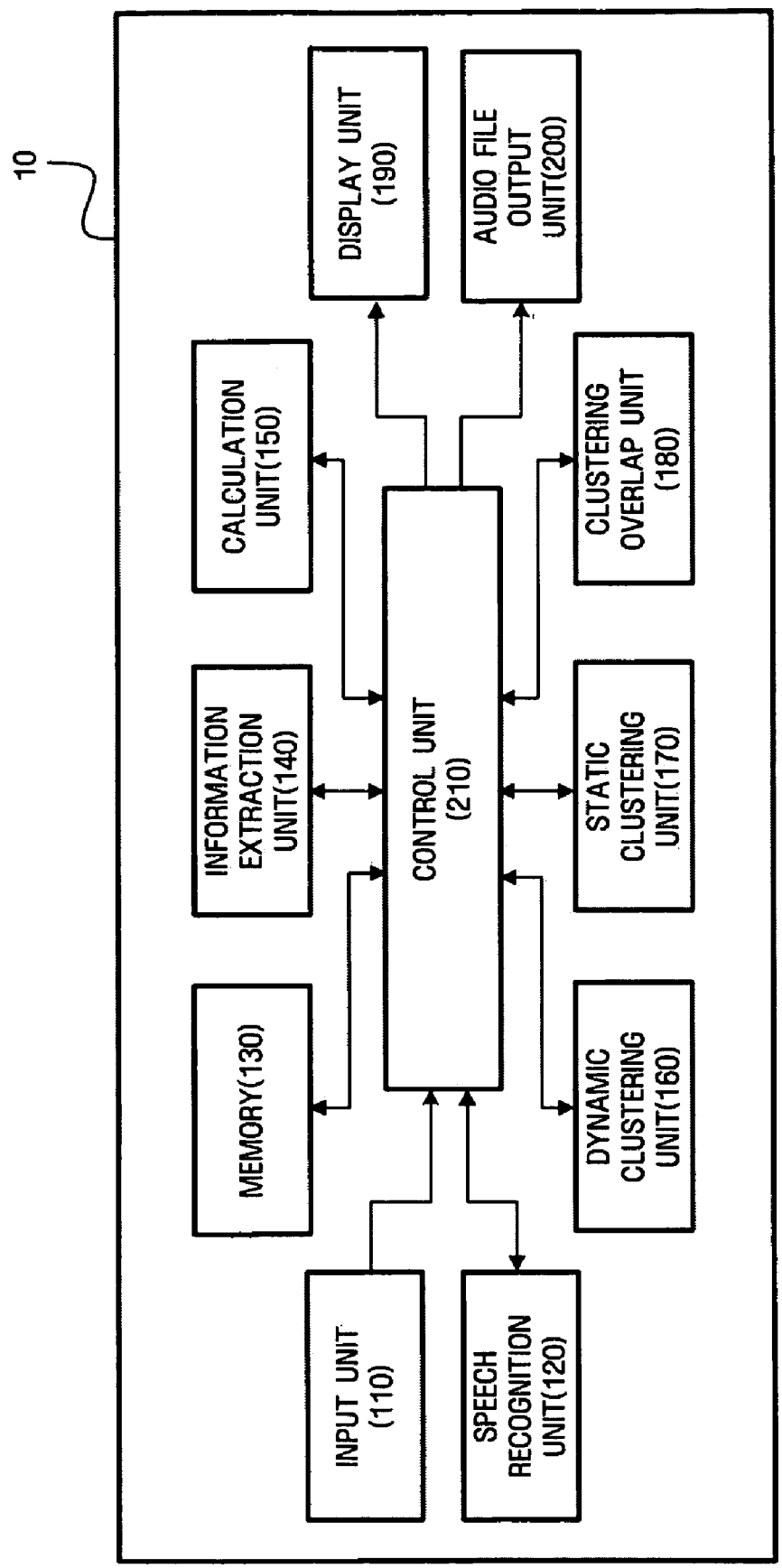
FIG. 1 illustrates an apparatus providing audio files with clustering, according to an embodiment of the present invention.

Reference will now be made in detail to embodiments of the present invention, examples of which are illustrated in the accompanying drawings, wherein like reference numerals refer to the like elements throughout. Embodiments are described below to explain the present invention by referring to the figures.

FIG. 1 illustrates an apparatus providing audio files with clustering, according to an embodiment of the present invention.

As shown in FIG. 1, an audio file player 10 may include a speech input unit 110, a speech recognition unit 120, a memory 130, an information extraction unit 140, a calculation unit 150, a dynamic clustering unit 160, a static clustering unit 170, a cluster overlap unit 180, a display unit 190, an audio file output unit 200, and a control unit 210, for example.

As an example, the input unit 110 may receive an oral query from a user, and may further, at the same time, sense peripheral noises and the user's motion status.

For example, if the user enters a specified query, e.g., through a voiced query, the input unit 110 receives the uttered audio data along with peripheral noise and the user's motion status and checks the environment of the audio file currently being used by the user. The environment information, checked by the user, may be stored along with metadata of corresponding audio data and used when static clustering is performed.

The speech recognition unit 120 may recognize the user's speech (query) input through the input unit 110, and analyze the query uttered from the user to identify which audio file the user desires to use.

The memory 130 may be used to store the audio files, metadata of the audio files, core index words, and peripheral information on corresponding audio files, for example.

Thus, if the user utters a query A, the speech input unit 110 may sense the user's query and peripheral silence along with the user's static status, and transmit the sensing result to the memory 130. The memory 130 may then add the "silent environment" to the peripheral environment information of the audio file corresponding to the query, and provide corresponding information during later static clustering.

An example information table stored, e.g., in the memory 130, will now be described with reference to FIG. 2. The memory 130 may store an ID of a specified audio file, a core index word of an audio file extracted from the information extraction unit 140, term frequency (tf) calculated by the calculation unit 150, and document frequency (df), in a table format, wherein the tf and the df may be updated whenever the audio file is updated. The information stored in the memory 130 may be used to retrieve similar audio files when the query uttered from the user is input.

The information extraction unit 140 may extract metadata from the audio file, and extract the core index words on the basis of the extracted metadata.

In other words, the information extraction unit 140 may tag the metadata information (for example, music title, singer's name, musical composer, album name, genre, the song's words, and review information) in accordance with a part of speech, and recognize the words tagged in accordance with a part of speech.

Then, the information extraction unit 140 extracts the core index words among the recognized words. The core index word can mean a word generally used. The information extraction unit 140 may extract the core index words stored in the memory 130 when the core words are extracted from a specified audio file based on the metadata information.

A process of allowing the information extraction unit 140 to extract core index words of the audio file will now be described in more detail with reference to FIG. 3.

As an example, if the audio file has a file name, "sad love song OST, Seungheon Song—even after the lapse of ten years. mp3," the information extraction unit 140 may tag a part of speech for the file name, in operation S10.

Then, the information extraction unit 140 may recognize individuals (words) tagged in accordance with a part of speech, in operation S20, and extracts the core index words among the recognized words, in operation S30. The core index word means a word used frequently among the recognized words, and the information extraction unit 140 extracts the core index words referring to a core index word table, e.g., stored in the memory 130.

Next, the information extraction unit 140 may set emotion information (for example, delight, sadness, and fear) on the extracted core index words, in operation S40.

The extracted core index word information and the emotion information may then respectively be stored in a corresponding table of the memory 130, for example, according to audio files.

The calculation unit 150 may calculate weights of core index words of a corresponding audio file using the index word information extracted through the information extraction unit 140, and compare the calculated weights with the query input from the user so as to calculate scores.

A weight of a core index word of a specified audio file may be calculated according to the below Equation (1).

$$weight(x_i) = \frac{tf}{0.5 + 1.5s\frac{doclength}{avg.doclength} + tf} s\log\left(\frac{N - df + 0.5}{df + 0.5}\right) \quad \text{Equation (1)}$$

Here, 'doclength' represents the number of core index words of a current audio file, 'avg.doclength' represents an average document length of audio files, 'tf' represents the frequency of the current core index word shown in a corresponding audio file, 'df' represents the number of audio files that include the current core index word, and 'N' represents the total number of audio files stored, e.g., in the memory 130.

The score between the query input from the user and the specified audio file may then be calculated according to the below Equation (2). It should be understood that the score corresponding to the calculated value exists between the specified audio file and the query uttered from the user if the calculated score is not equal to 0.

$$score(d) = \overset{m}{\underset{i=0}{Q}} weight_d(q_i) sweight(q_i) \quad \text{Equation (2)}$$

Here, 'weight$_d$(q$_i$)' represents the weight of the core index word q$_i$ in the audio file d, and 'weight(qi)' represents the weight of the core index word q$_i$.

For example, if there are three audio files A, B and C, the audio file A will be presumed to have core index words a, d, a, b, the audio file B will have core index words, c, d, d, a, and the audio file C will have core index words e, f, g.

Thus, first, the audio file A will have a doc length of 4, the audio file B will have a doc length of 4, and the audio file C will have a doc length of 3, resulting in an avg.doc length of 3.67 being obtained among the audio files.

Then, the core index word a of the audio file A will have a tf of 2 and df of 2, its core index word d will have a tf of 1 and df of 3, and its core index word b will have a tf of 1 and df of 1. Similarly, the core index word c of the audio file B will have a tf of 1 and df of 1, its core index word d will have a tf of 2 and df of 3, and its core index word a will have a f of 1 and df of 2. Likewise, the core index word e of the audio file C will have a tf of 1 and df of 1, its core index word f will have a tf of 1 and df of 1, and its core index word g will have a tf of 1 and df of 1.

Next, unique IDs can be assigned to the core index words a, b, c, d, e, f, and g existing in the audio files A, B and C.

For example, unique IDs of a=>1, b=>2, c=>3, d=>4, e=>5, f=>6, and g=>7 may be assigned.

The corresponding weights of the core index words of the respective audio files, calculated according to Equation (1), are shown below in Table 1.

TABLE 1

| Audio file | ID | | | | | | |
|---|---|---|---|---|---|---|---|
| | 1 | 2 | 3 | 4 | 5 | 6 | 7 |
| A | −0.11 | 0.07 | 0 | −0.27 | 0 | 0 | 0 |
| B | −0.07 | 0 | 0.07 | −0.11 | 0 | 0 | 0 |
| C | 0 | 0 | 0 | 0 | 0.07 | 0.07 | 0.07 |

Thus, if the user utters queries d, f and f, the scores between the queries d, f and f input from the user and the specified audio file are calculated, as follows, through Equation (2).

First, weight(q$_i$) may be calculated, wherein q$_i$ represents d and f. In other words, weight(d) is ⅓ and weight(f) is ⅔.

Then, weight$_d$(q$_i$) may be calculated referring to Table 1. In other words, the score value (i.e., weight$_A$(d)s weight(d)=−0.11s 0.33=−0.04) between the core index word d of the audio file A and the user's query d is −0.04, and the score value (i.e., weight$_A$(f)s weight(f)=0s 0.66=0) between the core index word f of the audio file A and the user's query d is 0. Accordingly, the score between the audio file A and the user's query is −0.04.

Also, the score value between the core index word d of the audio file B and the user's query d is −0.04, and the score value between the core index word f of the audio file B and the user's query f is 0. Accordingly, the score between the audio file B and the user's query is −0.04.

The score value between the core index word d of the audio file C and the user's query d is 0, and the score value between the core index word f of the audio file C and the user's query f is 0.05. Accordingly, the score between the audio file C and the user's query is 0.05.

The dynamic clustering unit 160 detects audio files having specified scores with the queries input from the user and calculates similar audio files, among the detected audio files (score among audio files), to group the audio files. In order to group audio files, scores among the audio files should be calculated.

The scores among the audio files may be calculated according to Equation (3).

$$sim(x, y) = \frac{x \in y}{||x|| ||y||} \quad \text{Equation (3)}$$

As another example, the four audio files A, B, C and D may be considered to exist and may be divided into two clusters.

First, the audio file A may be determined to be a central point in the first cluster while the audio file B may be determined as a central point in the second cluster. The dynamic clustering unit 160 performs clustering of the first cluster to collect an audio file (for example, audio file D) similar to the audio file A, and also performs clustering of the second cluster to collect an audio file (for example, audio file C) similar to the audio file B.

Next, each central point of the first and second clusters is calculated. As a result, the central point of the first cluster becomes (A+D)/2, and the central point of the second cluster becomes (B+C)/2.

Then, the dynamic clustering unit 160 performs clustering again in the first cluster to collect the audio file C, and also performs clustering in the second cluster to collect the audio file A. As a result, the central point of the first cluster becomes (D+C)/2, and the central point of the second cluster becomes (A+B)/2.

Subsequently, the dynamic clustering unit 160 performs clustering again in the first cluster to obtain the central point of (D+C)/2, and also performs clustering in the second cluster to obtain the central point of (A+B)/2.

Thus, if each central point of the first and second clusters remains unchanged, dynamic clustering of the first and second clusters ends.

Index words representative of the first and second clusters, of which the dynamic clustering have been performed, may then be calculated according to Equation (4).

$$weight(x_i) = \frac{tfc}{0.5 + 1.5s \frac{clusterlength}{avg.clusterlength} + tfc} s \log\left(\frac{CN - cf + 0.5}{cf + 0.5}\right) \quad \text{Equation (4)}$$

Here, 'clusterlength' represents the number of core index words of audio files corresponding to the current cluster, 'avg.clusterlength' represents an average cluster length of clusters, tfc (term frequency of cluster) represents the frequency of the core index words shown in a corresponding dynamic cluster, dfc (document frequency of cluster) represents the number of dynamic clusters that include the current core index words, and CN represents the total number of dynamic clusters.

Accordingly, one or two core index words having high weight values may become representative index words of the corresponding dynamic cluster.

The static clustering unit 170 detects audio files having specified scores with the queries input from the user and performs static clustering based on the weight values of the core index words of the detected audio files. The dynamic clustering is intended to display the detected audio files on one screen while the static clustering is intended to give the user cluster of audio files that may bring about interest of the user.

For example, the static clustering unit 170 aligns core index words based on the weight values of the core index words of the audio files having specified scores with the queries uttered from the user.

Next, the static clustering unit 170 determines whether the weight value of the aligned core index word is greater than a first threshold value $\theta_1$, and also determines whether df of the corresponding core index word is greater than a second threshold value $\theta_2$.

As a result, if the weight value of the core index word is greater than the first threshold value and df of the corresponding core index word is greater than the second threshold value, the static clustering unit 170 may generate a specified static cluster. As audio files that include such core index words make up one cluster, a corresponding core index word becomes a representative word of the cluster. The process of performing static clustering will be described later in more detail below with reference to FIG. 7.

The cluster overlap unit 180 overlaps the dynamic cluster generated through the dynamic clustering unit 160 with the static cluster generated through the static clustering unit 170 so as to provide a cluster suitable for the query input from the user.

In other words, the cluster overlap unit 180 aligns both clusters based on the representative index words of the clusters. In this case, the cluster overlap unit 180 may calculate an average of the weight values of the representative index words of a corresponding cluster and align the clusters on the basis of the calculated weight values.

Next, the cluster overlap unit 180 may calculate an overlap value of the first and second clusters, and display the corresponding clusters on the screen if the calculated overlap value does not exceed a third threshold value $\theta_3$, for example.

The cluster overlap unit 180 may align the clusters on the basis of the representative index words of the clusters, for example, with the cluster having alignment number 1 being displayed on the screen.

Then, the cluster overlap unit 180 may overlap the cluster A having alignment number 1 with the cluster B having alignment number 2. Here, as an example, it will be assumed that the number of audio files corresponding to the cluster A is 10, the number of audio files corresponding to the cluster B is 5, and the number of common elements between the cluster A and the cluster B is 2. In this case, 2/(10+5)=0.13 is obtained. Therefore, the overlap value would be equal to 0.13.

If the overlap value (i.e., 0.13) does not exceed the third threshold value, e.g., 0.2, the cluster B may be displayed on the screen.

The display unit 190 displays clusters, which are determined to be displayed through the cluster overlap unit 180, on the screen. The clusters may be displayed as predetermined characters or icons selected as representative core words, for example.

Also, the display unit 190 may display text or graphics of the audio files. The display unit 190 may also be a liquid crystal display (LCD) with an LCD driver, for example. The LCD may have an icon display window and a graphic dot display window of 128×32 pixels, for example, noting that alternative examples are available. Icons for displaying the remaining battery, key hold, play mode, genre, volume, and remaining memory capacities may be displayed on the icon display window. Information on music, telephone and memo may also be displayed on the graphic dot display window of 128×32 pixels. Since data relating to the information is stored in the memory 130, e.g., in a bit map data type as described above, they are directly displayable on the display window in a bit map image without any additional signal process operations. Also, different languages may also be displayed on the display window.

The audio file output unit 200 may output specified audio files selected from the user through a speaker or an earphone, for example.

The control unit 210 may control a whole operation of the elements included in the audio file player 10, and if the user's query is input from the speech input unit 110, control the speech recognition unit 120 to analyze the input query, noting that alternative embodiments are equally available.

In order to detect the audio files similar to the analyzed query, the control unit 210 may control the calculation unit 150 to calculate the weights of the core index words of the respective audio files and to calculate the scores between the audio files and the user's query using the calculated weights.

Furthermore, the control unit 210 may control the static clustering unit 160 and the static clustering unit 170 to perform clustering of the audio files having specified scores, and control the cluster overlap unit 180 to overlap the static cluster with the dynamic cluster and, thus, to provide the user a display of the cluster most suitable for the user's query.

Furthermore, the control unit 210 may control the audio file output unit 200 to output a specified audio file selected from the user, for example.

Figure 4:
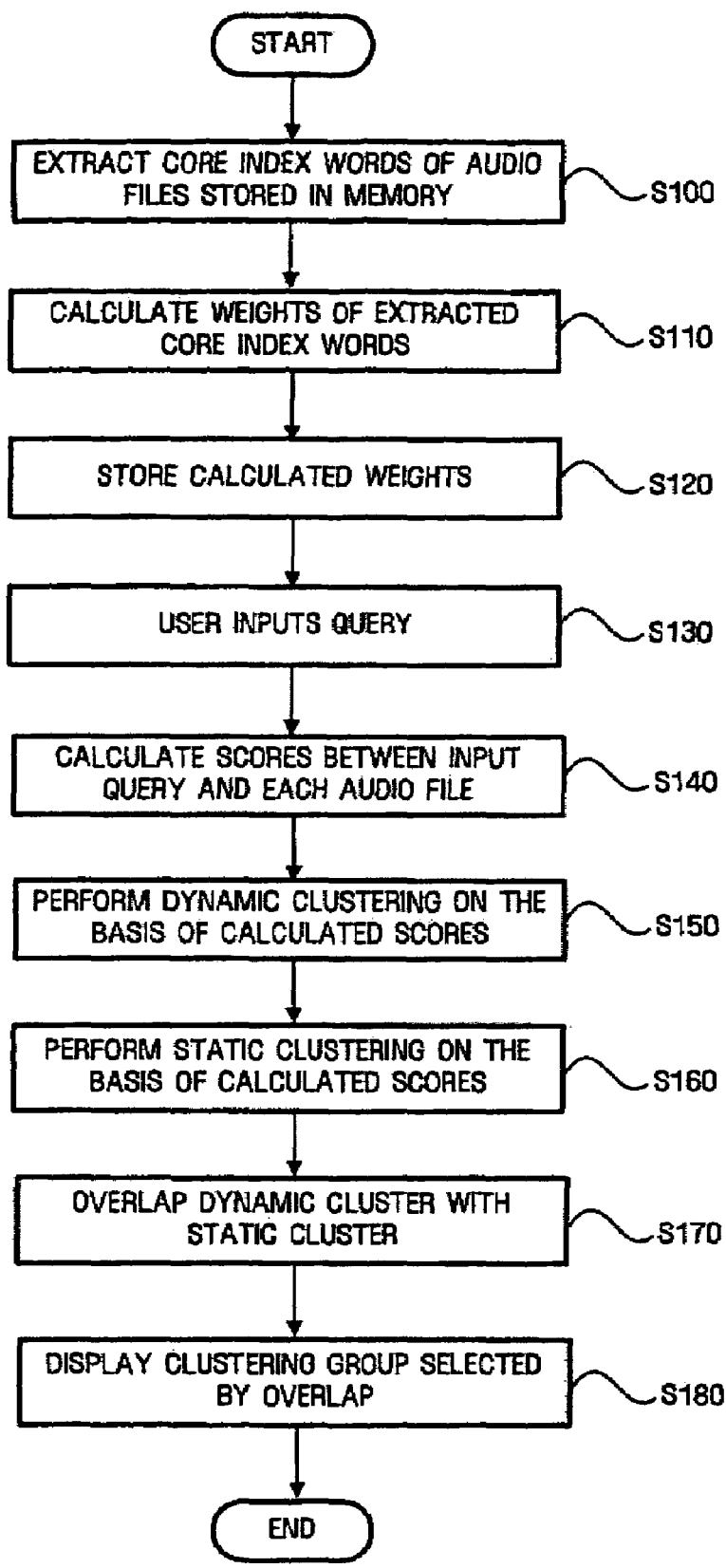
FIG. 4 illustrates a method for providing audio files with clustering, according to an embodiment of the present invention.

FIG. 4 illustrates a providing of audio files using clustering, according to an embodiment of the present invention.

The information extraction unit 140 may extract metadata from the audio files, e.g., stored in the memory 130, and extract core index words of a corresponding audio file on the basis of the extracted metadata, in operation S100. The process of extracting the core index words will now be described in more detail. The information extraction unit 140 may tag the metadata information (for example, music title, singer's name, musical composer, album name, and genre) in accordance with a part of speech, and recognizes individuals (i.e., words) tagged in accordance with a part of speech.

Then, the information extraction unit 140 extracts the core index words among the recognized words. Again, the core index word means a word generally used. The information extraction unit 140 may then extract the core index words of the corresponding audio file referring to the core index word table, e.g., stored in the memory 130, or may extract the words frequently retrieved from the corresponding audio file as the core index words.

Next, the calculation unit 150 may calculate weights of the core index words extracted through the information extraction unit 140, e.g., using Equation (1), in operation S110. The weights of the core index words may be calculated so as to retrieve audio files similar to the query uttered from the user, with the process of calculating the weights of the core index words being described later in more detail with reference to FIG. 5.

The calculated weight of each core index word may be stored in the memory 130, in operation S120.

Then, if a specified query is uttered from the user, the speech input unit 110 may receive the user's speech, in operation S130. The input speech (i.e., query) may then be analyzed through the speech recognition unit 120.

In order to retrieve the audio files similar to the analyzed query, the calculation unit 150 calculates the scores between the audio files and the query, e.g., using Equation (2), on the basis of the weight values of the core index words of each audio file, e.g., as stored in the memory 130, in operation S140. It is to be understood that the score corresponding to the calculated value exists between the specified audio file and the query uttered from the user if the calculated score is not equal to 0.

The dynamic clustering unit 160 may perform dynamic clustering on the basis of the calculated scores, in operation S150, and the dynamic clustering unit 160 may detect audio files having specified scores with the query input from the user and collect similar audio files among the detected audio files to group them. The process of performing dynamic clustering will be described in more detail bellow with reference to FIG. 6.

The static clustering unit 170 may perform static clustering on the basis of the calculated scores, in operation S160, with the static clustering unit 170 retrieving audio files, which may bring about interest of the user, based on the audio files having specified scores with the query input from the user, and providing the retrieved audio files using clustering. In other words, the static clustering unit 170 may generate a static cluster based on weight values of core index words of the audio files having scores with the user's query. The process of performing static clustering will be described in more detail below with reference to FIG. 7.

The cluster overlap unit 180 may overlap the dynamic cluster generated through the dynamic clustering unit 160 with the static cluster generated through the static clustering unit 170, in operation S170, and display the cluster selected through overlap on the screen of the audio file player 10, for example, through the display unit 190, in operation S180. In this case, the cluster overlap is to select a cluster suitable for the user's query.

Accordingly, the user can listen to various audio files by selecting the displayed cluster.

Figure 5:
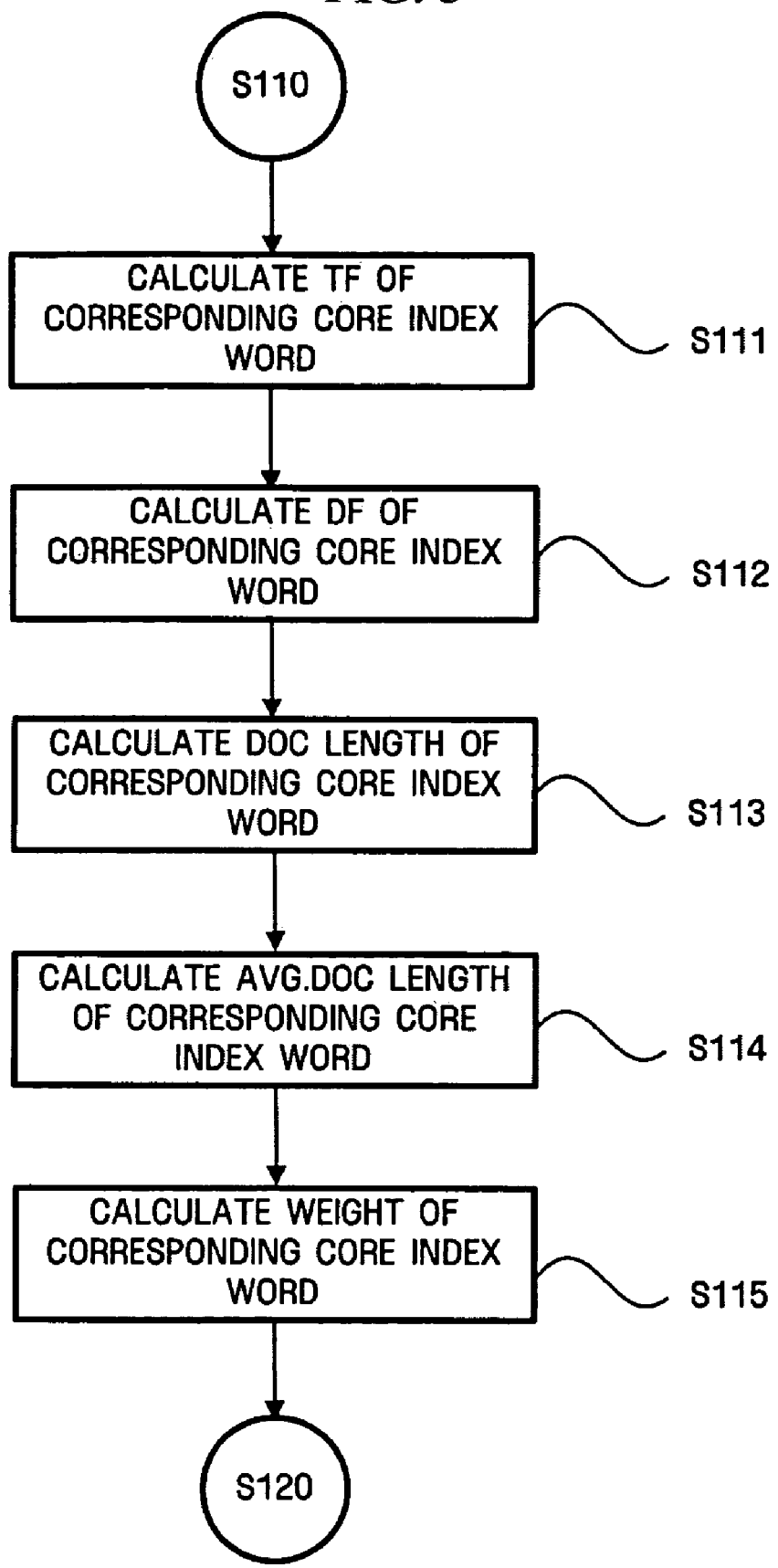
FIG. 5 illustrates a calculating of weights of core index words, according to an embodiment of the present invention.

FIG. 5 illustrates a calculating of the weights of the core index words, according to an embodiment of the present invention.

As shown in FIG. 5, if the information extraction unit 140 extracts the core index words from the metadata of the specified audio file, e.g., stored in the memory 130, the calculation unit 150 calculates tf of the current core index word in the corresponding audio file based on the extracted core index words, in operation S111, and then calculates df of the audio file that includes the current core index word S112.

The calculation unit 150 calculates the doclength, which is the number of the core index words in the current audio file, in operation S113, and calculates avg.doclength, which is an average doc length of all the audio files S114.

Then, the calculation unit 150 calculates the weights of the core index words detected from the specified audio file using the calculated tf, df, doclength and avg.doclength, in operation S115.

Accordingly, weights of the core index words of all the audio files stored in the memory 130, for example, can be calculated through the operations S111 to S115.

Figure 6:
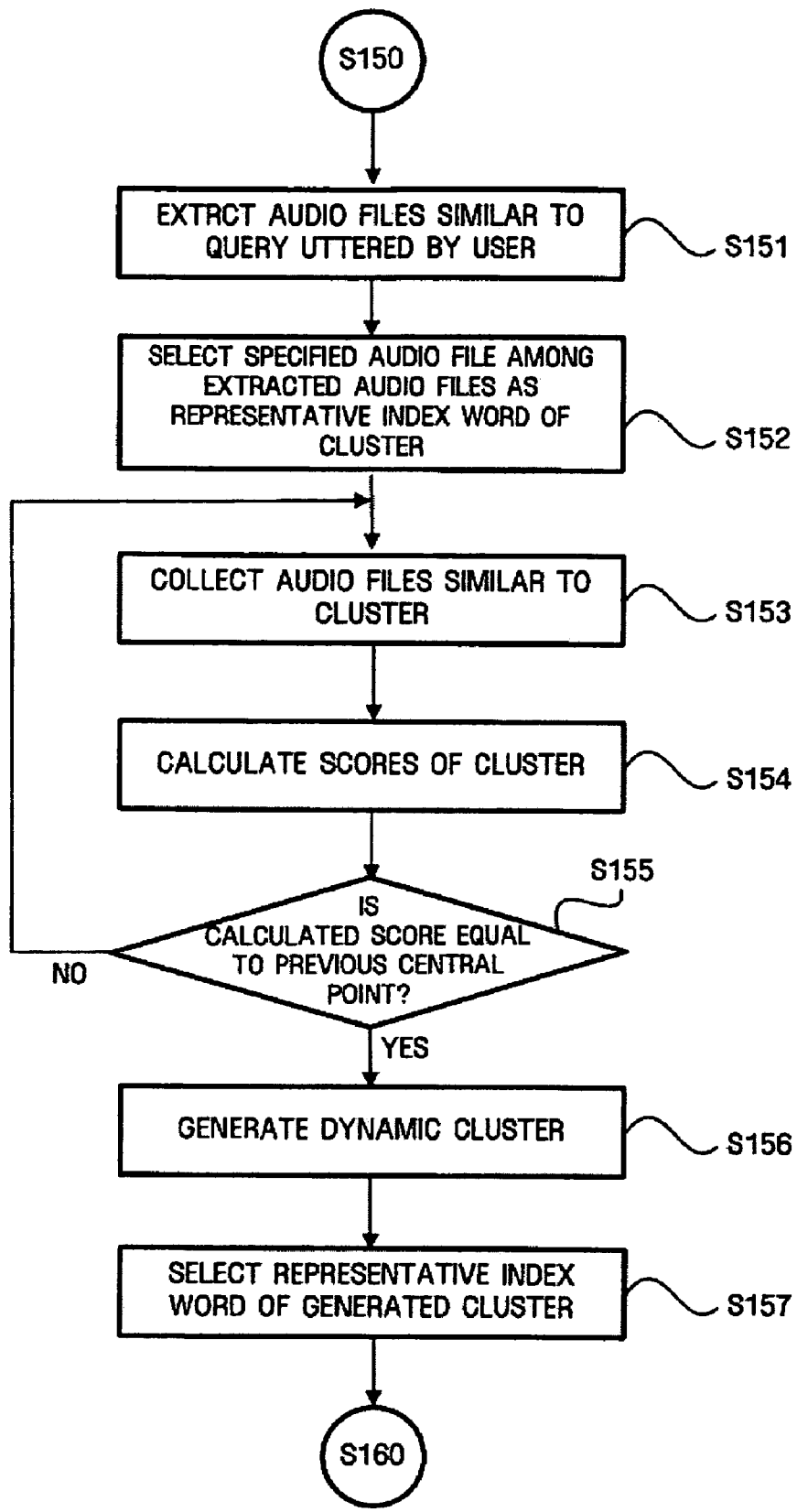
FIG. 6 illustrates a performing of a dynamic clustering, according to an embodiment of the present invention.

FIG. 6 illustrates the performing dynamic clustering, according to an embodiment of the present invention.

As shown in FIG. 6, the audio files having scores with the query uttered from the user are extracted, in operation S151. In this case, it will be assumed that audio files A, B, C and D have scored with the user's query. Also, the user or the control unit 210 may have previously set the desired number of clusters to be displayed. As only an example, it will be assumed that the number of the set clusters is 2.

The dynamic clustering unit 160 sets specified audio files (for example, audio files A and B) among the extracted audio files as examples of the respective clusters, in operation S152.

At this time, the cluster included in the audio file A is referred to as the first cluster, and the cluster included in the audio file B is referred to as the second cluster. The first cluster becomes a central point of the audio file A, and the second cluster becomes a central point of the audio file B.

Next, a specified audio file, e.g., audio file C, similar to the audio file A, is collected as the first cluster, and a specified audio file, e.g., audio file D, similar to the audio file B, is collected as the second cluster, in operation S153.

For each cluster a score (i.e., central point) of two audio files is calculated using Equation (3), for example, in operation S154. The score calculated through the equation 3 becomes a central point of each cluster.

It is checked whether a first central point value of a corresponding cluster is equal to a next central point value, in operation S155. As a result, if the first central point value is equal to the next central point value, it may be determined that similar audio files are grouped into one cluster.

Meanwhile, if the first central point value is not equal to the next central point value, operations S151 to S156 may continue to obtain the same central point.

Subsequently, if the cluster is generated in operation S156, a representative index word of the corresponding cluster may then be selected, in operation S157. The representative index word may be selected using Equation (4), for example. In other words, the index word having the greatest weight value in the corresponding cluster is selected as the representative index word.

Figure 7:
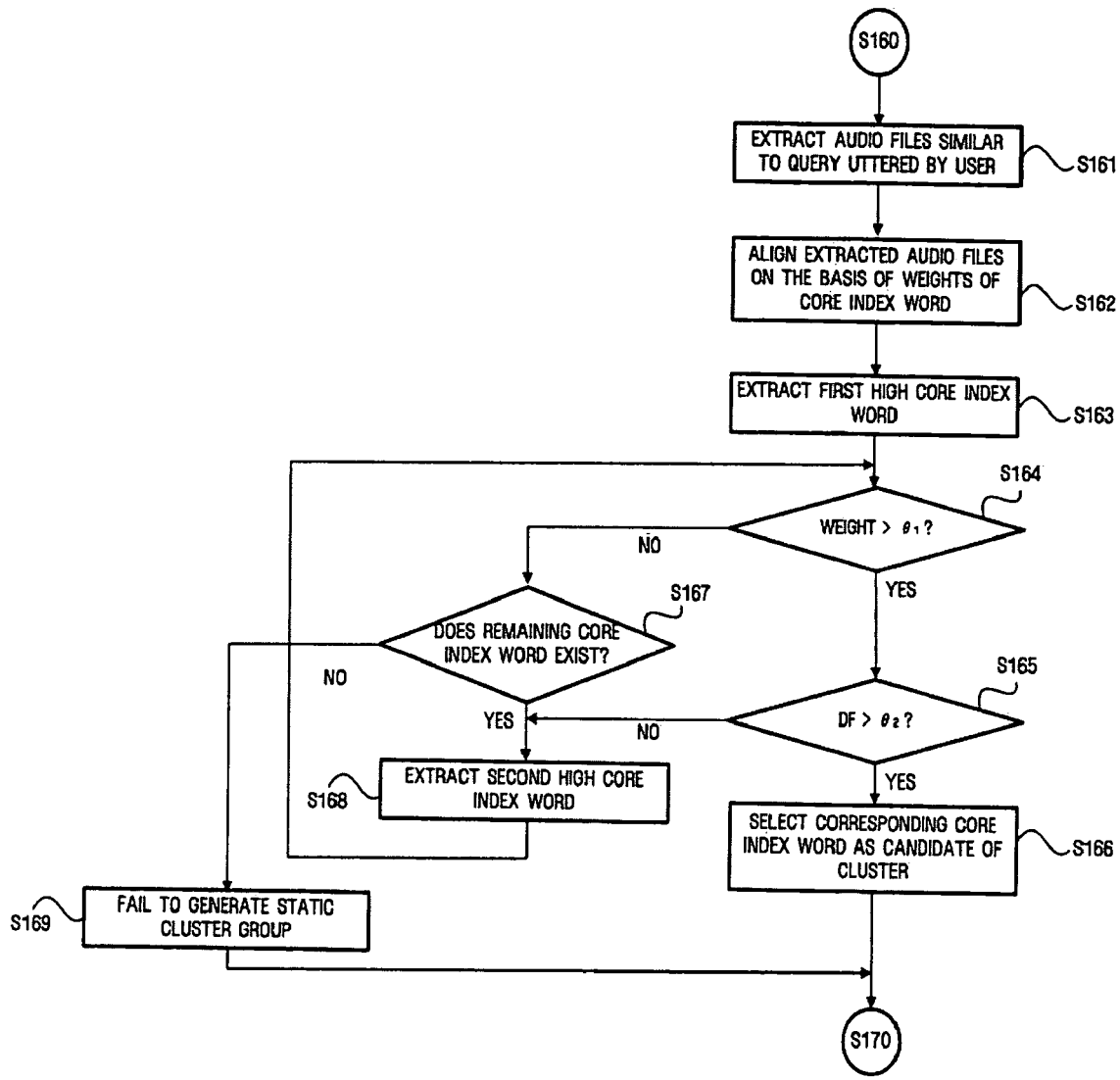
FIG. 7 illustrating a performing of a static clustering, according to an embodiment of the present invention.

FIG. 7 illustrates a performing of a static clustering, according to an embodiment of the present invention.

As shown in FIG. 7, the audio files having scores with the query uttered from the user are extracted, in operation S161, and the core index words of the extracted audio files are collected and then aligned based on the weights of the core index words S162.

Next, the core index word having the highest alignment order (for example, first core index word) is extracted, in operation S163, and it is determined whether the weight of the extracted core index word is greater than the first threshold value $\theta_1$, for example, in operation S164. The first threshold value may be set by the user or the control unit 210, noting that alternative embodiments are equally available.

As a result, if the weight of the extracted core index word is greater than the first threshold value $\theta_1$, it may be determined whether df of the first core index word is greater than the second threshold value $\theta_2$, for example, in operation S165. The second threshold value may be set by the user or the control unit 210, for example.

As a result, if df of the core index word is greater than the second threshold value, the first core index word may be selected as a candidate of a cluster, in operation S166.

Meanwhile, if the weight of the core index word is smaller than the first threshold value $\theta_1$, it may be checked whether the remaining core index word exists, in operation S167. If the remaining core index word exists, the core index word having the second alignment order (for example, second core index word) is extracted.

Next, the weight of the extracted second core index word is compared with the first threshold value. As a result, if the weight of the second core index word is greater than the first threshold value, operation S165 may be carried out again. Conversely, if the weight of the second core index word is smaller than the first threshold value, operation S167 may be carried out again.

Operations S164 to S168 may continue to be carried out until the remaining core index words exist. The core index words satisfying operations S164 and S165, during operations S161 to S168, are selected as candidates of the static cluster.

Figure 8:
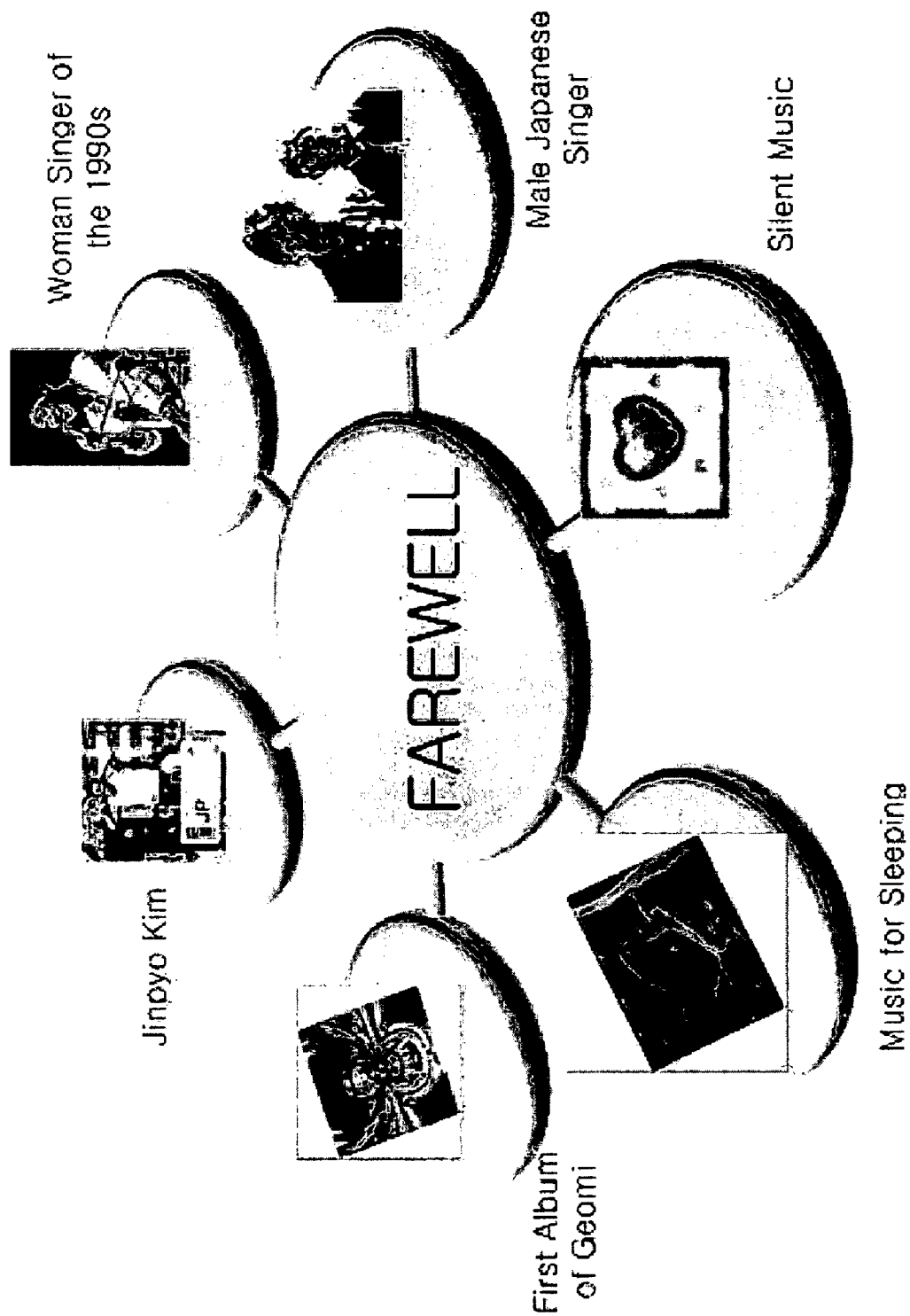
FIG. 8 illustrates results of a clustering in accordance with a query uttered from a user, according to an embodiment of the present invention.

FIG. 8 illustrates a result of clustering example, in accordance with a query uttered from the user, according to an embodiment of the present invention.

As shown in FIG. 8, if the user utters a query "farewell", the speech input unit 110 receives the query, and the speech recognition unit 120 analyzes the input query.

Then, the information extraction unit 140 retrieves audio files that include the analyzed query, and the calculation unit 150 calculates scores between the retrieved audio files and the query.

The audio files having score value, excluding 0, undergo dynamic clustering and static clustering to generate clusters having audio files similar to the query uttered from the user.

Next, the generated clusters are overlapped with each another to select again clusters suitable for the user's query, and the selected clusters are displayed on the screen through the display unit 190.

In the example, audio files similar to the query "farewell" uttered from the user are clustered with "woman singer in the 1990's," "Jinpyo KIM," "first album of Geomi," "music for sleeping," "silent music," and "Japanese man singer" and then displayed on the screen. In this case, there exist plural audio files suitable for the representative index word of each cluster, in each cluster. In other words, the cluster "silent music" includes all the songs having metadata (or index word information) titled "silent music" stored in the memory 130, for example.

The user selects a specified cluster among the clusters displayed on the screen so that various audio files in the selected cluster can be supplied to the user through the audio file output unit 200, for example.

As described above, the apparatus, medium, and method providing audio files with clustering according to an embodiment of the present invention has one or more of the following advantages. Audio files similar to the user's queries can be extracted and clustered so as to display specified clusters on one screen. In this case, the user can select desired audio files without having to sift through screens. In addition, since audio files similar to the user's queries undergo dynamic clustering and static clustering, the retrieval of the user's desired audio files is more exact.

Above, embodiments of the present invention have been described with reference to the accompanying drawings, e.g., illustrating block diagrams and flowcharts, for explaining a method and apparatus for providing audio files using clustering according to embodiments of the present invention, for example. It will be understood that each block of such flowchart illustrations, and combinations of blocks in the flowchart illustrations, may be implemented by computer readable instructions of a medium. These computer readable instructions may be provided to a processor of a general purpose computer, special purpose computer, or other programmable data processing apparatus to produce a machine, such that the instructions, which execute via the processor of the computer or other programmable data processing apparatus, implement the functions specified in the flowchart block or blocks.

These computer program instructions may be stored/transferred through a medium, e.g., a computer usable or computer-readable memory, that can instruct a computer or other programmable data processing apparatus to function in a particular manner. The instructions may further produce another article of manufacture that implements the function specified in the flowchart block or blocks.

In addition, each block of the flowchart illustrations may represent a module, segment, or portion of code, for example, which makes up one or more executable instructions for implementing the specified logical operation(s). It should also be noted that in some alternative implementations, the operations noted in the blocks may occur out of order. For example, two blocks shown in succession may in fact be executed substantially concurrently or the blocks may sometimes be executed in the reverse order, depending upon the functionality involved.

In embodiments of the present invention, the term "unit", as used herein, may mean, but is not limited to, a software or hardware component, such as a Field Programmable Gate Array (FPGA) or Application Specific Integrated Circuit (ASIC), which performs certain tasks. A unit may advantageously be configured to reside on an addressable storage medium and configured to execute on one or more processors. Thus, a unit may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables, noting that alternative embodiments are equally available. In addition, the functionality provided for by the components and modules may be combined into fewer components and modules or further separated into additional components and modules. Further, such a persistence compensation apparatus, medium, or method may also be implemented in the form of a single integrated circuit, noting again that alternative embodiments are equally available.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An apparatus, including at least one processing device, the apparatus comprising:

a calculation unit to calculate respective scores between a plurality of audio files and a query;

a dynamic clustering unit to identify first audio files, of the plurality of audio files, based on the calculated respective scores between the plurality of audio files and the query, and to dynamically cluster the identified first audio files by calculating scores between the identified first audio files, with dynamic clustering of the identified first audio files being repeated based on relatedness between calculated values representative of each cluster generated in separate dynamic clusterings of the identified first audio files;

a static clustering unit to identify second audio files, of the plurality of audio files, based on the calculated respective scores between the plurality of audio files and the query, and to cluster the identified second audio files based on respective weights of core index words of the identified second audio files, wherein the weights of the core index words are respective weights of extracted core index words for the plurality of audio files;

a cluster overlap unit to use the at least one processing device to overlap the dynamically clustered first identified audio files with the statically clustered second identified audio files, implemented as through at least one processor, to generate an overlapped cluster having audio files similar to the query;

and an output to output to a user a result of the overlapping to generate the overlapped cluster, wherein the relatedness between calculated values representative of each cluster, in the repeating of the dynamic clustering of the identified first audio files based on the relatedness between calculated values representative of each cluster generated in separate dynamic clusterings of the identified first audio files, is based on relatedness between calculated central points of each dynamically generated cluster, wherein if the calculated central point remains unchanged during repeating of the dynamic clustering, the dynamic clustering unit stops the dynamic clustering.

2. The apparatus of claim 1, further comprising a display unit displaying the overlapped cluster on a screen.

3. The apparatus of claim 1, further comprising an information extraction unit to extract metadata from audio files and to obtain the extracted core index words based on the extracted metadata.

4. The apparatus of claim 1, wherein the calculation unit further calculates the weights of the extracted core index words for the plurality of audio files, respectively.

5. An apparatus, including at least one processing device, the apparatus comprising:
a calculation unit to calculate respective scores between a plurality of audio files and a query;
a dynamic clustering unit to identify first audio files, of the plurality of audio files, based on the calculated respective scores between the plurality of audio files and the query, and to cluster the identified first audio files by calculating scores between the identified first audio files;
a static clustering unit to identify second audio files, of the plurality of audio files, based on the calculated respective scores between the plurality of audio files and the query, and to cluster the identified second audio files based on respective weights of core index words of the identified second audio files, wherein the weights of the core index words are respective weights of extracted core index words for the plurality of audio files; and
an output to output a result of dynamic clustering of the identified first audio files and/or a result of static clustering of the identified second audio files,
wherein the calculation unit further calculates the weights of the extracted core index words for the plurality of audio files, respectively, and
wherein the calculation unit, uses the at least one processing device to calculate the respective weights of the core index words based on:

$$weight(x_i) = \frac{tf}{0.5 + 1.5s\frac{doclength}{avg.doclength} + tf} s\log\left(\frac{N - df + 0.5}{df + 0.5}\right),$$

wherein doclength represents a number of core index words of a current audio file, avg.doclength represents an average document length of audio files, tf represents a frequency of a current core index word shown in a corresponding audio file, df represents a number of audio files that include the current core index word, and N represents a total number of audio files.

6. The apparatus of claim 1, wherein the calculation unit calculates the scores between the plurality of audio files and the query based on:

$$score(d) = \sum_{i=0}^{m} weight_d(q_i)sweight(q_i),$$

wherein weightd(qi) represents a weight of a core index word qi in an audio file d, and weight(qi) represents a weight of a core index word qi.

7. The apparatus of claim 1, wherein the dynamic clustering unit calculates the scores between the identified first audio files based on:

$$sim(x, y) = \frac{x \in y}{\|x\|\|y\|}.$$

8. The apparatus of claim 1, further comprising:
a speech recognition unit to receive an audible input query, as the query, and analyze the audible input query, input from the user, to attempt to recognize the audible input query.

9. The apparatus of claim 8, wherein the audible input query includes a plurality of words.

10. The apparatus of claim 1, further comprising:
non-volatile memory to store the plurality of audio files; and
a reproducing unit to output reproduced audio based upon a user selection,
wherein the user is provided with an audio file between the plurality of audio files based upon clustering from the dynamic and/or static clustering units.

11. A method for providing an audio file using clustering, comprising:
using at least one processor for calculating respective scores between a plurality of audio files and a query;
identifying first audio files, of the plurality of audio files, based on the calculated respective scores between the plurality of audio files and the query, and performing a dynamic clustering of the identified first audio files based on scores between the identified first audio files, with dynamic clustering of the identified first audio files being repeated based on relatedness between calculated values representative of each cluster generated in separate dynamic clusterings of the identified first audio files;
identifying second audio files, of the plurality of audio files, based on the calculated respective scores between the plurality of audio files and the query, and performing a static clustering of the identified second audio files based upon weights of detected core index words for the plurality of audio files; and
outputting a result of an overlapping of the dynamically clustered first identified audio files with the statically clustered second identified audio files representing an overlapped cluster having audio files similar to the query,
wherein the relatedness between calculated values representative of each cluster, in the repeating of the dynamic clustering of the identified first audio files based on the relatedness between calculated values representative of each cluster generated in separate dynamic clusterings of the identified first audio files, is based on relatedness between calculated central points of each dynamically generated cluster, wherein if the calculated central point remains unchanged during repeating of the dynamic clustering, the dynamic clustering is stopped.

12. The method of claim 11, further comprising:
displaying the result of the overlapping of the dynamically clustered first identified audio files with the statically clustered second identified audio files.

13. The method of claim 11, further comprising:
detecting respective core index words for the plurality of audio files; and
calculating weights of the detected respective core index words.

14. A method for providing an audio file using clustering, comprising:
detecting respective core index words for the plurality of audio files;
calculating weights of the detected respective core index words;
calculating respective scores between a plurality of audio files and a query;
identifying first audio files, of the plurality of audio files, based on the calculated respective scores between the plurality of audio files and the query, and performing a dynamic clustering of the identified first audio files based on scores between the identified first audio files;
identifying second audio files, of the plurality of audio files, based on the calculated respective scores between the plurality of audio files and the query, and performing a static clustering of the identified second audio files based upon weights of detected core index words for the plurality of audio files; and
outputting a result of the dynamic clustering of the identified first audio files and/or a result of the static clustering of the identified second audio files,
wherein the weights of the detected core index words are calculated based on:

$$weight(x_i) = \frac{tf}{0.5 + 1.5s\frac{doclength}{avg.doclength} + tf} s\log\left(\frac{N - df + 0.5}{df + 0.5}\right),$$

wherein doclength represents a number of core index words of a current audio file, avg.doclength represents an average document length of audio files, tf represents a frequency of a current core index word shown in a corresponding audio file, df represents a number of audio files that include the current core index word, and N represents a total number of audio files.

15. The method of claim 11, wherein the calculating of the respective scores between the plurality of audio files and the query is based on:

$$score(d) = \sum_{i=0}^{m} weight_d(q_i)sweight(q_i),$$

wherein weightd(qi) represents a weight of a core index word qi in an audio file d, and weight(qi) represents a weight of a core index word qi.

16. The method of claim 11, wherein the dynamic clustering is performed based on the scores between the identified first audio files through an equation:

$$sim(x, y) = \frac{x \in y}{\|x\|\|y\|}.$$

17. The method of claim 11, further comprising:
analyzing an audibly input query from the user, as the query, and performing recognition of the audible input query.

18. The method of claim 17, wherein the audible input query includes a plurality of words.

19. The method of claim 11, further comprising:
accessing non-volatile memory for the plurality of audio files; and
outputting reproduced audio based upon a user selection,
wherein the user is provided with an audio file from the plurality of audio files based upon the result of the dynamic clustering of the identified first audio files and/or the result of the static clustering of the identified second audio files.

20. A computer readable storage medium structure comprising computer readable code to control an implementation of the method of claim 11.

21. An apparatus, including at least one processing device, the apparatus comprising:
a calculation unit to calculate respective scores between a plurality of audio files and a query;
a dynamic clustering unit to identify first audio files, of the plurality of audio files, based on the calculated respective scores between the plurality of audio files and the query, and to dynamically cluster the identified first audio files based on different calculated scores between the identified first audio files and relatedness between calculated central points of each dynamically generated cluster, wherein if the calculated central point remains unchanged during repeating of the dynamic clustering, the dynamic clustering unit stops the dynamic clustering;
a static clustering unit to identify second audio files, of the plurality of audio files, based on the calculated respective scores between the plurality of audio files and the query, and to cluster the identified second audio files based on respective weights of core index words of the identified second audio files, wherein the weights of the core index words are respective weights of extracted core index words for the plurality of audio files;
a cluster overlap unit to use the at least one processing device to overlap the dynamically clustered first identified audio files with the statically clustered second identified audio files, implemented as through at least one processor, to generate an overlapped cluster having audio files similar to the query;
and an output to output to a user a result of the overlapping to generate the overlapped cluster.

22. The apparatus of claim 21, further comprising a display unit displaying the cluster generated by the cluster overlap unit on a screen.

23. The apparatus of claim 21, further comprising:
a speech recognition unit to receive an audible input query, as the query, and analyze the audible input query, input from the user, to attempt to recognize the audible input query.

24. The apparatus of claim 23, wherein the audible input query includes a plurality of words.

25. The apparatus of claim 21, further comprising:

non-volatile memory to store the plurality of audio files; and a reproducing unit to output reproduced audio based upon a user selection, wherein the user is provided with an audio file between the plurality of audio files based upon clustering from the dynamic and/or static clustering units.

26. A method for providing an audio file using clustering, comprising:

using at least one processor for calculating respective scores between a plurality of audio files and a query;

identifying first audio files, of the plurality of audio files, based on the calculated respective scores between the plurality of audio files and the query, and performing a dynamic clustering of the identified first audio files based on different calculated scores between the identified first audio files and relatedness between calculated central points of each dynamically generated cluster, wherein if the calculated central point remains unchanged during repeating of the dynamic clustering, the dynamic clustering is stopped;

identifying second audio files, of the plurality of audio files, based on the calculated respective scores between the plurality of audio files and the query, and performing a static clustering of the identified second audio files based upon weights of detected core index words for the plurality of audio files; and outputting a result of an overlapping of the dynamically clustered first identified audio files with the statically clustered second identified audio files representing an overlapped cluster having audio files similar to the query.

27. The method of claim 26, further comprising:

displaying the result of the overlapping of the dynamically clustered first identified audio files with the statically clustered second identified audio files.

28. The method of claim 26, further comprising:

analyzing an audibly input query from the user, as the query, and perform recognition of the audible input query.

29. The method of claim 28, wherein the audible input query includes a plurality of words.

30. The method of claim 26, further comprising:

accessing non-volatile memory for the plurality of audio files; and outputting reproduced audio based upon a user selection, wherein the user is provided with an audio file from the plurality of audio files based upon the result of the dynamic clustering of the identified first audio files and the result of the static clustering of the identified second audio files.

31. A computer readable storage medium structure comprising computer readable code to control an implementation of the method of claim 26.

* * * * *

UNITED STATES PATENT AND TRADEMARK OFFICE
CERTIFICATE OF CORRECTION

| | | |
|---|---|---|
| PATENT NO. | : 7,593,937 B2 | Page 1 of 1 |
| APPLICATION NO. | : 11/489463 | |
| DATED | : September 22, 2009 | |
| INVENTOR(S) | : In-ho Kang et al. | |

It is certified that error appears in the above-identified patent and that said Letters Patent is hereby corrected as shown below:

Title Page; item (56);

First Page, Column 2 (Other Publications), Line 1, change "Clutering:" to --Clustering:--.

Column 16, Line 7, change "weightd(qi)" to --weight$_d$(qi)--.

Column 17, Line 62, change "weightd(qi)" to --weight$_d$(qi)--.

Signed and Sealed this

Twelfth Day of January, 2010

David J. Kappos
*Director of the United States Patent and Trademark Office*